(12) United States Patent
Erickson et al.

(10) Patent No.: US 11,878,346 B2
(45) Date of Patent: Jan. 23, 2024

(54) OBJECTS HAVING CORES WITH NANOPARTICLE BINDERS

(71) Applicant: HEWLETT-PACKARD DEVELOPMENT COMPANY, L.P., Houston, TX (US)

(72) Inventors: Kristopher J. Erickson, Palo Alto, CA (US); Thomas C. Anthony, Palo Alto, CA (US); Lihua Zhao, Palo Alto, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1293 days.

(21) Appl. No.: 16/076,159

(22) PCT Filed: Jul. 31, 2017

(86) PCT No.: PCT/US2017/044657
§ 371 (c)(1),
(2) Date: Aug. 7, 2018

(87) PCT Pub. No.: WO2019/027417
PCT Pub. Date: Feb. 7, 2019

(65) Prior Publication Data
US 2021/0197272 A1    Jul. 1, 2021

(51) Int. Cl.
*B22F 10/16*      (2021.01)
*B33Y 10/00*      (2015.01)
(Continued)

(52) U.S. Cl.
CPC ............... *B22F 10/16* (2021.01); *B22F 1/10* (2022.01); *B22F 1/102* (2022.01); *B22F 10/14* (2021.01);
(Continued)

(58) Field of Classification Search
None
See application file for complete search history.

(56) References Cited

U.S. PATENT DOCUMENTS 8,540,505 B2    9/2013   Farr et al.
9,428,610 B2    8/2016   Diekmann et al.
(Continued)

FOREIGN PATENT DOCUMENTS

CN        104947076 A    9/2015
CN        106927847 B    8/2020
(Continued)

OTHER PUBLICATIONS

Bai, J.G. et al. "Inkjet printable nanosilver suspensions for enhanced sintering quality in rapid manufacturing." Nanotech, Inst of Physics Publishing, vol. 18, No. 18. Published May 9, 2007.
(Continued)

*Primary Examiner* — Elizabeth Collister
(74) *Attorney, Agent, or Firm* — Shook, Hardy & Bacon L.L.P.

(57) ABSTRACT

According to examples, an object may include a shell including a polymer binder and build material powder; and a core at least partially encompassed by the shell, the core
(Continued)

including build material powder and a metal nanoparticle binder.

14 Claims, 3 Drawing Sheets

(51) Int. Cl.
| | |
|---|---|
| B33Y 70/00 | (2020.01) |
| B33Y 80/00 | (2015.01) |
| B29C 64/165 | (2017.01) |
| B28B 1/00 | (2006.01) |
| C09D 11/037 | (2014.01) |
| C09D 11/101 | (2014.01) |
| B22F 10/38 | (2021.01) |
| B22F 10/14 | (2021.01) |
| B22F 1/10 | (2022.01) |
| B22F 1/102 | (2022.01) |
| B29K 505/00 | (2006.01) |
| B29K 509/02 | (2006.01) |
| B22F 12/55 | (2021.01) |

(52) U.S. Cl.
CPC .............. *B22F 10/38* (2021.01); *B28B 1/001* (2013.01); *B29C 64/165* (2017.08); *B33Y 10/00* (2014.12); *B33Y 70/00* (2014.12); *B33Y 80/00* (2014.12); *C09D 11/037* (2013.01); *C09D 11/101* (2013.01); *B22F 12/55* (2021.01); *B22F 2302/45* (2013.01); *B29K 2505/00* (2013.01); *B29K 2509/02* (2013.01)

(56) References Cited

U.S. PATENT DOCUMENTS

| | | |
|---|---|---|
| 2011/0076438 A1 | 3/2011 | Farr |
| 2014/0275317 A1 | 9/2014 | Moussa |
| 2015/0069649 A1 | 3/2015 | Bai |
| 2016/0136889 A1 | 5/2016 | Rolland |
| 2016/0332373 A1 | 11/2016 | Kuhn |
| 2016/0339517 A1 | 11/2016 | Joshi et al. |
| 2016/0354839 A1 | 12/2016 | Schick et al. |
| 2017/0022370 A1 | 1/2017 | Farrugia et al. |
| 2017/0297106 A1* | 10/2017 | Myerberg ............... B29C 64/20 |

FOREIGN PATENT DOCUMENTS

| | | |
|---|---|---|
| EP | 0644809 B1 | 7/2001 |
| EP | 3117982 | 1/2017 |
| WO | 2009017648 A1 | 2/2009 |
| WO | WO-2016007224 A2 | 1/2016 |
| WO | 2017018984 A1 | 2/2017 |
| WO | WO-2017094345 | 6/2017 |

OTHER PUBLICATIONS

Bai et al., "Binderless Jetting—Using Nanoparticles to Replace Polymer Binders in Binder Jetting of Metal", Retrieved from Internet: http://vtip.technologypublisher.com/technology/22915, 2016, 1 page.

* cited by examiner

OBJECTS HAVING CORES WITH NANOPARTICLE BINDERS

BACKGROUND

In three-dimensional (3D) printing, an additive printing process may be used to make three-dimensional solid parts from a digital model. 3D printing techniques are considered additive processes because they involve the application of successive layers of material. This is unlike other machining processes, which often rely upon the removal of material to create the final part. In 3D printing, the building material may be cured or fused, which for some materials may be performed using heat-assisted extrusion, melting, or sintering, and for other materials, may be performed using digital light projection technology.

BRIEF DESCRIPTION OF THE DRAWING

Features of the present disclosure are illustrated by way of example and not limited in the following figure(s), in which like numerals indicate like elements, in which.

DETAILED DESCRIPTION

For simplicity and illustrative purposes, the present disclosure is described by an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are a 3D printer, methods for implementing the 3D printer to form a 3D part, and a composition and an agent for use in the method. A 3D part may be printed, formed, or otherwise generated onto a build area platform. The 3D printer may also include a spreader to spread a layer of the composition onto the build area platform, and a printhead to selectively deposit the agent. The 3D printer may form successive layers of the composition, which may be spread and may receive the agent. Energy may be applied and extra composition removed in order to form a green body. The green body may then be exposed to heating and/or radiation to form a brown body. The brown body may be further processed by annealing to form the 3D part. As used herein "3D printed part," "3D part," "3D object," "object," or "part" may be a completed 3D printed part or a layer of a 3D printed part.

Figure 1:
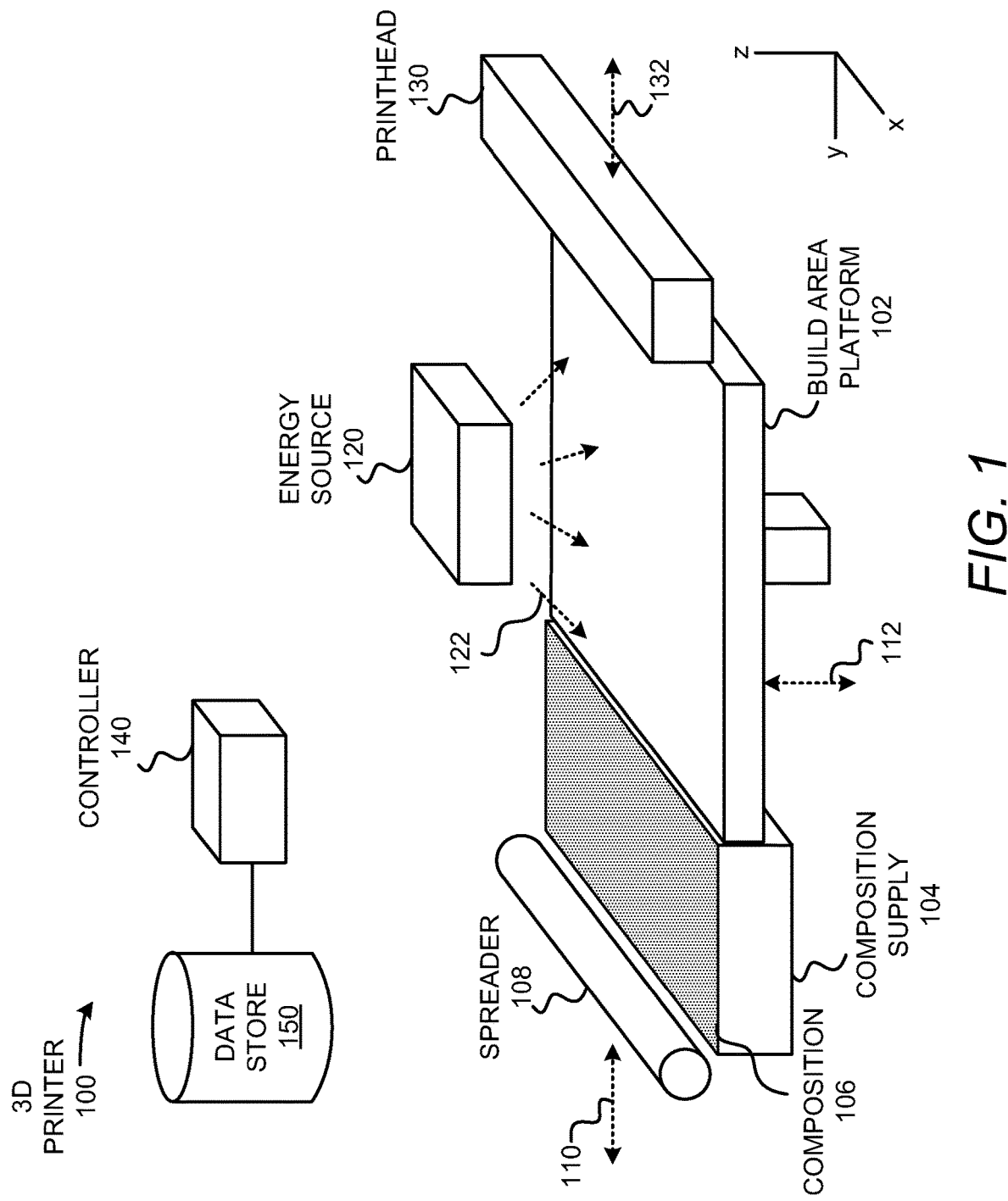
FIG. 1 shows a simplified isometric view of an example three-dimensional (3D) printer for generating, building, or printing three-dimensional parts.

With reference first to FIG. 1, there is shown a simplified isometric view of an example 3D printer 100 for generating, building, or printing three-dimensional parts. It should be understood that the 3D printer 100 depicted in FIG. 1 may include additional components and that some of the components described herein may be removed and/or modified without departing from a scope of the 3D printer 100 disclosed herein. It should also be understood that the components of the 3D printer 100 depicted in FIG. 1 may not be drawn to scale and thus, the 3D printer 100 may have a different size and/or configuration other than as shown therein. The 3D printer 100 may be used to form an object including a shell including a polymer binder and build material powder; and a core at least partially encompassed by the shell, the core including build material powder and a metal nanoparticle binder. In an example, the 3D printer 100 may be used to form an object including a shell having a polymer binder and a build material powder; and a core at least partially encompassed by the shell, in which a volume ratio of a loading of the polymer binder in the shell to a loading of the metal nanoparticle binder in the core ranges from about 1:2 to about 100:1.

The 3D printer 100 is depicted as including a build area platform 102, a composition supply 104 containing the composition 106, and a spreader 108. The build area platform 102 may be integrated with the 3D printer 100 or may be a component that is separately insertable into the 3D printer 100, e.g., the build area platform 102 may be a module that is available separately from the 3D printer 100. The composition supply 104 may be a container or surface that is to position the composition 106 between the spreader 108 and the build area platform 102. The composition supply 104 may be a hopper or a surface upon which the composition 106 may be supplied. The spreader 108 may be moved in a direction as denoted by the arrow 110, e.g., along the y-axis, over the composition supply 104 and across the build area platform 102 to spread a layer of the composition 106 over a surface of the build area platform 102.

The composition 106 may include a build material powder. The build material powder may be selected from the group consisting of metals, metal alloys, and ceramics. Non-limiting examples of metals include alkali metals, alkaline earth metals, transition metals, post-transition metals, lanthanides, and actinides. The alkali metals may include lithium, sodium, potassium, rubidium, cesium, and francium. The alkaline earth metals may include beryllium, magnesium, calcium, strontium, barium, and radium. The transition metals may include scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, and gold. The post-transition metals include aluminum, indium, tin, thallium, lead, and bismuth. In an example, the build material powder may be chosen from aluminum, copper, $Ti_6Al_4V$, $AlSi_{10}Mg$, bronze alloys, stainless steel, Inconel, and cobalt-chromium, and nickel-molybdenum-chromium alloys.

Non-limiting examples of metal alloys include steel, solder, pewter, duralumin, phosphor bronze, amalgams, stainless steel alloys 303, 304, 310, 316, 321, 347, 410, 420, 430, 440, PH13~8, 17~4PH, Fe/Ni, Fe/Si, Fe/Al, Fe/Si/Al, Fe/Co, magnetic alloys containing Fe/Co/V; satellite 6 cobalt alloy including satellites 12; copper, copper alloys, bronze (Cu/Sn), brass (Cu/Zn), tin, lead, gold, silver, platinum, palladium, iridium, titanium, tantalum, iron, aluminum alloys, magnesium including alloys, iron alloys, nickel alloys, chromium alloys, silicon alloys, zirconium alloys, gold alloys, and any suitable combination.

The ceramics may be nonmetallic, inorganic compounds, such as metal oxides, inorganic glasses, carbides, nitrides, and borides. Some specific examples include alumina ($Al_2O_3$), $Na_2O/CaO/SiO_2$ glass (soda-lime glass), silicon carbide (SiC), silicon nitride ($Si3N_4$), silicon dioxide ($SiO_2$), zirconia (ZrO$_2$), yttrium oxide-stabilized zirconia (YTZ), titanium dioxide (TiO$_2$), or combinations thereof. In an example, the build material powder may be a cermet (a metal-ceramic composite).

The 3D printer 100 is further depicted as including a printhead 130 that may be scanned across the build area platform 102 in the direction indicated by the arrow 132, e.g., along the y-axis. The printhead 130 may be, for instance, a thermal inkjet printhead, a piezoelectric printhead, etc., and may extend a width of the build area platform 102. Although a single printhead 130 has been depicted in FIG. 1, it should be understood that multiple printheads may be used that span the width of the build area platform 102. Additionally, the printheads 130 may be positioned in multiple printbars. The printhead 130 may also deposit an agent over a selected area of a layer of the composition 106. In an aspect, multiple printheads 130 may independently deposit the same or different agent over a selected area of a layer of the composition 106. In an aspect, the multiple printheads 130 can simultaneously or sequentially deposit the same or different agents over a selected area of a layer of the composition 106.

In one example, a first printhead may deposit an agent including a polymer binder over a first select area of a layer of the composition 106 to form a shell. In an aspect, the agent may include a polymer binder and a metal salt. In another aspect, the agent may also include a metal nanoparticle binder. The first select area of a layer of the composition may form a shell of an object, such as a green body. In an aspect, the shell may have a thickness ranging from about 1 mm to about 20 mm, for example, from about 2 mm to about 18 mm, and as a further example, from about 4 mm to about 12.5 mm. A thickness ratio of the shell to the core can range from about 1:1 to about 1:5.

In another example, a second printhead may deposit an agent including a metal nanoparticle binder over a second select area of a layer of the composition 106 to form a core. In an aspect, the agent may also include a polymer binder. The second select area of a layer of the composition 106 may form a core of the object.

A volume ratio of the polymer binder in the shell to the metal nanoparticle binder in the core may range from about 250:1 to about 1:20, for example, 100:1 to about 5:15, as a further example, from about 20:10 to about 1:2. The object may include the polymer binder present in an amount ranging from about 0.05 wt. % to about 5 wt. %, for example, about 1 wt. % in the shell; and may include the metal nanoparticle binder present in an amount ranging from about 0.02 wt. % to about 10 wt. %, for example, from about 0.5 wt. % to about 2 wt. % in the core.

The agent may be a composition including various components that may be applied to the layer of the composition 106. Non-limiting examples of components of the agent include a polymer binder, a metal nanoparticle binder, a pigment, a dye, a solvent, a co-solvent, a surfactant, a dispersant, a biocide, an anti-cogation agent, viscosity modifiers, buffers, stabilizers, and combinations thereof. The presence of a co-solvent, a surfactant, and/or a dispersant in the agent may assist in obtaining a particular wetting behavior with the composition 106. In an aspect, more than one agent may be used during the 3D printing process. As an example, an agent including a polymer binder may be deposited over a first select area of a layer of the composition 106. As another example, an agent including a metal nanoparticle binder may be deposited over a second select area of a layer of the composition 106.

The polymer binder may be a semi-crystalline polymer, such as polypropylene and polyethylene. The polymer binder may be a non-crystalline polymer, such as polyethylene oxide, polyethylene glycol (solid), acrylonitrile butadiene styrene, polystyrene, styrene-acrylonitrile resin, and polyphenyl ether. The polymer binder may be selected from the group consisting of polypropylene, polyethylene, poly (methyl methacrylate), low density polyethylene, high density polyethylene, polyethylene oxide, polyethylene glycol, acrylonitrile butadiene styrene, polystyrene, styrene-acrylonitrile resin, polyphenyl ether, polyamide 11, polyamide 12, polymethyl pentene, polyoxymethylene, polyethylene terephthalate, polybutylene terephthalate, polyvinylidene fluoride, polytetrafluoroethylene, perfluoroalkoxy alkane, polyphenylene sulfide, polyurethanes, polyvinyl alcohol, polylactic acid, and polyether ether ketone.

The polymer binder may have a melting point temperature less than about 250° C., for example the melting point temperature may range from about 50° C. to about 249° C., for example from about 60° C. to about 240° C., and as a further example from about 70° C. to about 235° C.

The polymer binder may be present in the agent in an amount ranging from about 1% to about 10% by volume, for example from about 2% to about 6%, and as a further example from about 3% to about 5% by volume. In another aspect, the polymer binder may be present in the agent in an amount up to 100% by volume loading, for example, if using a piezo ink jet to jet the polymer precursor materials. The amount of the polymer binder may be chosen to provide shape integrity to the green body.

The agent may further include other suitable binders such as metal salts, sugars, sugar alcohols, polymeric or oligomeric sugars, low or moderate molecular weight polycarboxylic acids, polysulfonic acids, water soluble polymers containing carboxylic or sulfonic moieties, and polyether alkoxy silane. Some specific examples include glucose (C$_6$H$_{12}$O$_6$), sucrose (C$_{12}$H$_{22}$O$_{11}$), fructose (C$_6$H$_{12}$O$_6$), maltodextrines with a chain length ranging from 2 units to 20 units, sorbitol (C$_6$H$_{14}$O$_6$), erythritol (C$_4$H$_{10}$O$_4$), mannitol (C$_6$H$_{14}$O$_6$), or CARBOSPERSE® K7028 (a short chain polyacrylic acid, M~2,300 Da, available from Lubrizol). Low or moderate molecular weight polycarboxylic acids (e.g., having a molecular weight less than 5,000 Da) may dissolve relatively fast. It is to be understood that higher molecular weight polycarboxylic acids (e.g., having a molecular weight greater than 5,000 Da up to 10,000 Da) may be used; however the dissolution kinetics may be slower.

The agent may include a metal nanoparticle binder. The metal nanoparticle binder may promote interparticle bonding of the build material powder and/or may increase the interparticle friction between the build material powder. The metal nanoparticle binder may be a material that will bond to the build material powder at temperatures which are in or below the relevant debile temperature range. For example, without limitation, the metal nanoparticle binder may be the same ceramic, metal or metal alloy or a metal or metal alloy that diffuses into the build material powder, e.g., silver or gold nanoparticles may be used with gold alloy build material powder. Additional non-limiting examples of metal nanoparticle binder may include AlN, SiC, Si$_3$N$_4$, WC, Al$_2$O$_3$, Al(OH)$_3$, Fe$_2$O$_3$, Fe$_3$O$_4$, MgO, SiO$_2$, TiO$_2$, Y$_2$O$_3$, ZnO, ZrO$_2$, BaCO$_3$, In$_2$O$_3$, SnO$_2$, carbon, magnesium, manganese, aluminum, iron, titanium, niobium, tungsten, chromium, tantalum, cobalt, nickel, vanadium, zirconium, molybdenum, palladium, platinum, copper, saver, gold, cadmium, zinc, and combinations of these with each other and/or with a nonmetallic element or elements. In an aspect, the metal present in the metal nanoparticle binder may be the same as a metal in the build material powder. In another aspect, the metal present in the metal nanoparticle binder may be different from a metal in the build material powder.

The metal nanoparticle binder may be particles with dimensions that are in the nanometer size range, that is, from about 1 nanometer to 1,000 nanometers. In an example, the nanoparticles may be in a size range of about 1 nanometer to about 100 nanometers, and for example within a range of about 1 to about 50 nanometers. The nanoparticles may have any shape. The nanoparticle material kind, size, and shape may be chosen so that the nanoparticles interparticle bond to the build material powder through either chemical or physical bonding to provide structural strength to the as-built object.

The 3D printer 100 may include multiple printheads 130, in which each printhead 130 may have the same or different agent. In an example, a printhead 130 may have an agent including a polymer binder; and another printhead 130 may have an agent including a metal nanoparticle binder.

Additionally, the agent of each printhead may independently include more than one kind of polymer binder or metal nanoparticle binder. For example, an agent including a metal nanoparticle binder may include metal nanoparticles of both gold alloys and of silver alloys. Similarly, an agent including a polymer binder may include polypropylene and polyethylene. As a further example, an agent may include a polymer binder and a metal nanoparticle binder. This may be useful where it is desired to locally vary the composition of the agent.

Surfactant(s) may be used to improve the wetting properties and the jettability of the agent. Examples of suitable surfactants may include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant may be an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Some examples of a co-solvent include 1-(2-hydroxyethyl)-2-pyrollidinone, 2-Pyrrolidinone, 1,5-Pentanediol, Triethylene glycol, Tetraethylene glycol, 2-methyl-1,3-propanediol, 1,6-Hexanediol, Tripropylene glycol methyl ether, N-methylpyrrolidone, Ethoxylated Glycerol-1 (LEG-1), and combinations thereof.

Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.).

Non-limiting examples of suitable anti-cogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Following selective deposition of the agent onto selected areas of the layer of the composition 106, the build area platform 102 may be lowered as denoted by the arrow 112, e.g., along the z-axis. In addition, the spreader 108 may be moved across the build area platform 102 to form a new layer of composition 106 on top of the previously formed layer. In an aspect, the spreader 108 may spread a layer of build material powder. Moreover, the printhead 130 may deposit the agent onto predetermined areas of the new layer of composition 106. For example, the printhead 130 may deposit a polymer binder on areas selected as a shell of the object and may deposit a metal nanoparticle binder on areas selected as a core of the object. In this manner, a debind step (removal of the polymer binder from the object) may be executed more efficiently as compared to an object with the polymer binder located throughout the object. The above-described process may be repeated until a predetermined number of layers have been formed to fabricate a green body of a desired 3D part.

As also shown in FIG. 1, the 3D printer 100 may include a controller 140 that may control operations of the build area platform 102, the composition supply 104, the spreader 108, the energy source 120, and the printhead 130. The controller 140 is also depicted as being in communication with a data store 150. The data store 150 may include data pertaining to a 3D part to be printed by the 3D printer 100.

A green body may be created from areas of the composition 106 that have received the agent from the printhead 130. Upon application of energy 122, such as by heat lamps, ultraviolet lights, and the like, the selectively deposited agent may absorb the energy to form a green body from the spread layer of the build material powder, the selectively deposited polymer binder, and the selectively deposited metal nanoparticle binder. In an aspect, the object may include a shell having a strength greater than about 1 MPa, for example, greater than about 1.5 MPa, and as a, further example, greater than about 3 MPa.

The applied energy 122 may be removed and the green body may cool by removal of the energy. Upon cooling, the formed green body may solidify. The green body/object may include the shell and the core, in which the core is at least partially encompassed by the shell. In an aspect, the core is at least about 50% encompassed by the shell, for example, at least about 75%, and as a further example, at least about 90% encompassed by the shell. In an aspect, the core is completely encompassed by the shell. The formed green body may be removed from the build platform.

Figure 2:
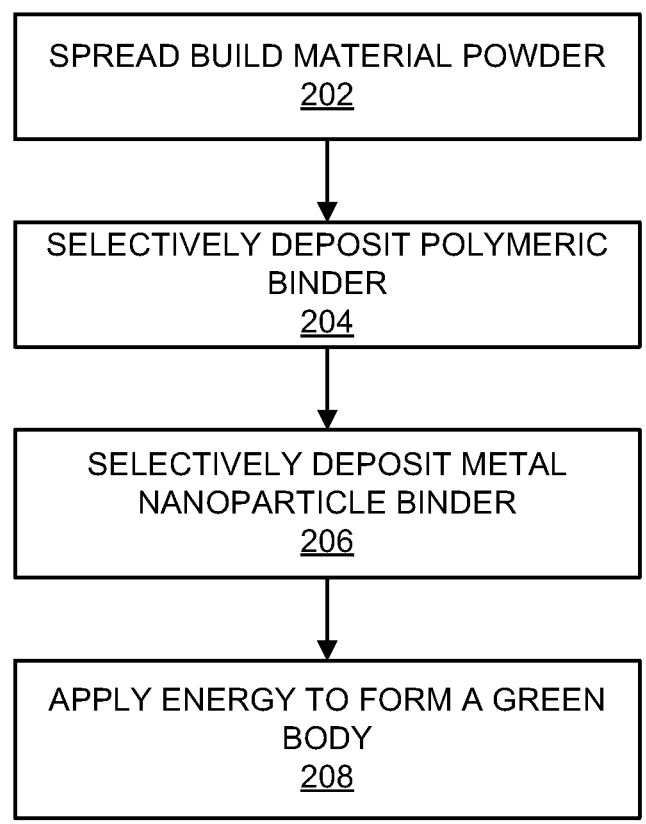
FIGS. 2 and 3, respectively, show flow diagrams of example methods of fabricating a 3D part.
Figure 3:
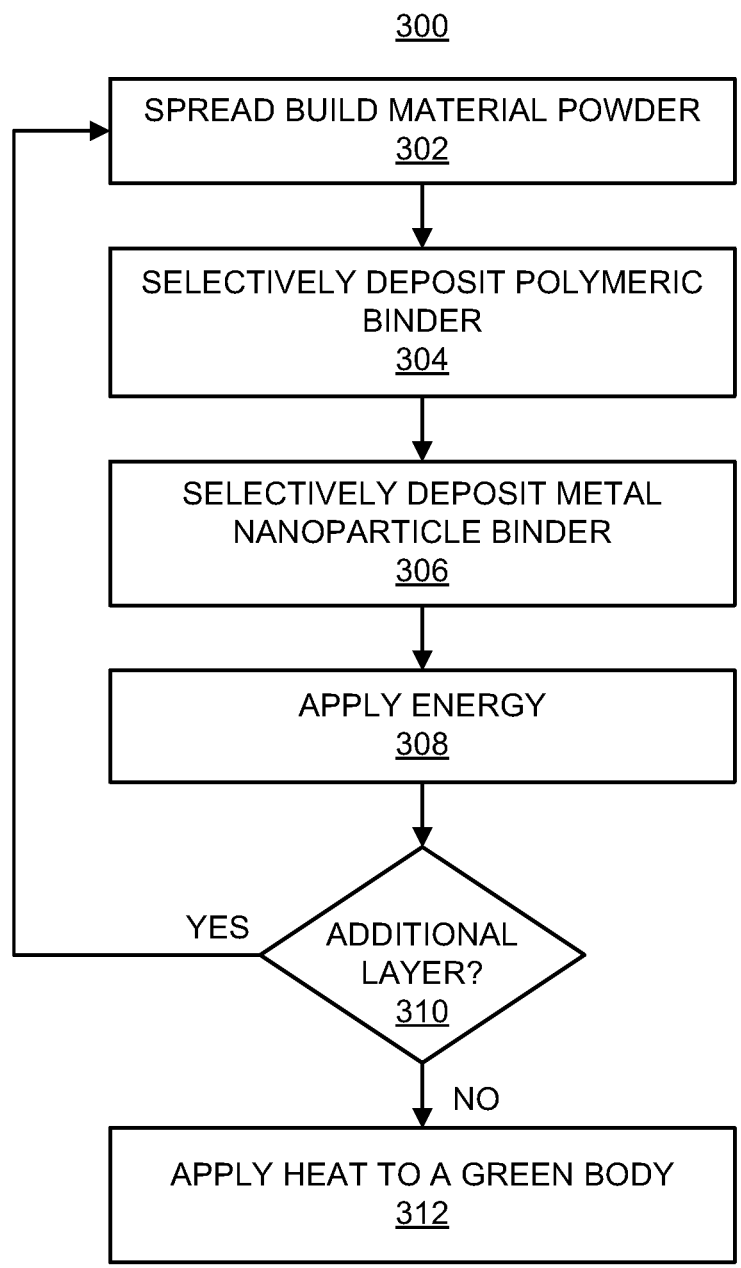

Various manners in which an example 3D part may be fabricated are discussed in greater detail with respect to the example methods 200 and 300 respectively depicted in FIGS. 2 and 3. It should be apparent to those of ordinary skill in the art that the methods 200 and 300 may represent generalized illustrations and that other operations may be added or existing operations may be removed, modified, or rearranged without departing from the scopes of the methods 200 and 300.

The descriptions of the methods 200 and 300 are made with reference to the 3D printer 100 illustrated in FIG. 1 for purposes of illustration. It should, however, be clearly understood that 3D printers and other types of apparatuses having other configurations may be implemented to perform either or both of the methods 200 and 300 without departing from the scopes of the methods 200 and 300.

Prior to execution of the method 200 or as part of the method 200, the 3D printer 100 may access data pertaining to a 3D part that is to be printed. By way of example, the controller 140 may access data stored in the data store 150 pertaining to a 3D part that is to be printed. The controller 140 may determine the number of layers of composition 106 that are to be formed and the locations at which an agent from the printhead 130 is to be selectively deposited on areas, to impart improved strength, of each of the respective layers of composition 106.

With reference first to FIG. 2, at block 202, a composition 106 may be spread over a build area platform 102. As discussed herein, the composition 106 may be formed of build material powder. In addition, at block 204, a polymeric binder may be selectively deposited onto a first select area on the spread layer of the build material to form a shell of a green body. At block 206, a metal nanoparticle binder may be selectively deposited onto a second select area on the spread layer of the build material to form a core of a green body. In addition, in some examples, a plurality of agents may be selectively deposited onto the build material powder. In these examples, one of the agents may be applied to the areas that are to form a shell of the green body and another one of the agents may be applied to the areas that are to form a core of the green body. In an example, the polymer binder may be selectively deposited over a first area of the spread layer of the build material powder that will form the green body leaving a third area of the spread build material powder that will not form the green body.

At block 208, energy 122 may be applied onto the spread layer of build material powder, the selectively deposited polymer binder, and the selectively deposited metal nanoparticle binder to form a green body. Block 208 may represent a plurality of operations in which multiple layers of build material powder are spread, selectively deposited with polymer binder and/or metal nanoparticle binder, and supplied with energy to form the green body, in which parts of the green body are formed in each of the successively formed layers.

Turning now to FIG. 3, at block 302, the build material powder may be spread, at block 304, a polymer binder may be selectively deposited onto the spread build material powder; and at block 306, a metal nanoparticle binder may be selectively deposited onto the spread build material powder. Blocks 302, 304, and 306 may be similar to blocks 202, 204, and 206 discussed above with respect to FIG. 2. In addition, at block 308, energy 122 may be applied in manners similar to those discussed above with respect to block 208. At block 310, a determination may be made, for instance, by a processor of the 3D printer 100, as to whether an additional layer of the build material powder is to be formed. In response to a determination that another layer of the build material powder is to be formed, blocks 302-308 may be repeated on top of a previously deposited layer.

However, in response to a determination that an additional layer is not to be formed, the formed layers, e.g., green body, may be cooled and removed from the 3D printer 100. Removal of the green body may cause it to cool to room temperature and solidify.

Extraneous composition, such as the build material powder, may be removed to form the green body. By way of example, the green body may be placed in a media blasting cabinet and the extraneous composition may be sandblasted away from the green body. An air gun or brush may be used to remove extraneous composition. As another example, the extraneous composition may be removed through mechanical vibration and/or other removal techniques.

Following removal of the extraneous composition, the green body may be subjected to further processing to form a brown body and/or the final 3D part. Heat or radiation may be applied to the green body from a heat or radiation source (not shown). By way of example, the green body may be placed into a furnace or oven that is able to heat the green body at different temperatures, in which the different temperatures may range from a temperature that is approximately equal to the melting temperature of a polymer binder to a temperature that is sufficient to cause the build material powder of the composition to debind and/or sinter with metal nanoparticle binder. The metal nanoparticle binder may interparticle bind with the build material powder to provide increased structural strength to the core of the brown body. The interparticle binding may prevent the brown body from sagging, warping, breaking, or otherwise disfiguring from an intended shape. This may be beneficial in large 3D parts or 3D parts having thin or unsupported sections. In another example, the green body may be placed in multiple furnaces or ovens that are each at different temperatures during successive periods of time in order to form the brown body and/or the final 3D part.

The temperatures at which the heat is applied may be progressively increased. That is, at block 312, energy, for example, in the form of heat, may be applied to the green body at a first temperature, which may be equal to approximately a decomposition temperature of the polymer binder. In large objects, the polymer binder may debind at a faster rate at the surface or shell of the green body (i.e., object) and may debind at a slower rate at the interior or core of the green body. The slower debind rate may lead to an increase in time until the debinding is complete, making it difficult to predict the length of time for complete debinding. Confining the polymer binder to a shell of predetermined thickness within the green body may reduce the polymer debinding time and may make the debinding time more predictable. Furthermore, with polymer binder not present in the core there is less of a likelihood of pressure buildup of polymer decomposition products that may lead to internal cracking of parts during the debind step. In an aspect, the debind rate may range from about 1 min/mm (from edge to center of green body) to about 7 min/mm, for example from about 2 min/mm to about 6 min/mm, and as a further example, from about 3 min/mm to about 4 min/mm. The first temperature may debind the polymer binder to form a brown body. The brown body may no longer include the polymer binder and/or substantial polymer binder residue after a period of time because any residual polymer binder in the brown body may change the chemical composition and properties of the final part. Furthermore, the metal nanoparticle binder in the core does not go through a debinding stage, so debinding time may be reduced compared to when a polymer binder is present in the entire part volume (both shell and core). Additionally, the metal nanoparticle binder may be retained in the core throughout the polymer debinding process, affording strength to the brown body and/or 3D part after the polymer binder has been removed. In an example, tensile strength of the brown body in the core may by greater than 10 kPa. In another example, tensile strength of the brown body in the core may be greater than 100 kPa. In yet another example, tensile strength of the brown body in the core may by greater than 1 MPa.

At block 312, applying energy may further include applying sufficient energy, such as in the form of heat, to sinter the build material powder.

By way of example, the temperature may progressively increase from about 200° C. to about 230° C. to above, for example above 500° C., to complete debinding and then progressively increase to sintering temperatures around 1000° C. and in other examples, above around 1500° C. In addition, the increasing temperature may cause the density of the brown body to be increased. The length of time at which the heat is applied may be dependent, for example, on at least one of: characteristics of the heat or radiation source, characteristics of the build material powder; and/or characteristics of the agent. In an example, the heat may be applied in an oxidizing or a reducing atmosphere, with or without an inert gas. In another example, the heat may be applied in an inert atmosphere or in a vacuum.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A green body, comprising:
   a shell including a polymer binder and build material powder selected from the group consisting of a metal, a metal alloy, and a ceramic; and
   a core at least partially encompassed by the shell, the core consisting of the build material powder, a nanoparticle binder selected from the group consisting of AlN SiC, $Si_3N_4$, WC, $Al_2O_3$, Al(OH)$_3$, $Fe_2O_3$, $Fe_3O_4$, MgO, $SiO_2$, $TiO_2$, $Y_2O_3$, ZnO $ZrO_2$, $BaCO_3$, $In_2O_3$, $SnO_2$, carbon, magnesium, manganese, aluminum, iron, titanium, niobium, tungsten, chromium, tantalum, cobalt, nickel, vanadium, zirconium, molybdenum, palladium, platinum, copper, silver, gold, cadmium, zinc, and combinations thereof, and one or more of a pigment, a dye, a solvent, a co-solvent, a surfactant, a biocide, an anti-kogation agent, a viscosity modifier, a buffer, and a stabilizer, a nanoparticle binder having a size ranging from about 1 nm to about 100 nm.

2. The green body of claim 1, wherein the polymer binder is selected from the group consisting of polypropylene, polyethylene, low density polyethylene, high density polyethylene, polyethylene oxide, polyethylene glycol, acrylonitrile butadiene styrene, polystyrene, styrene-acrylonitrile resin, polyphenyl ether, polyamide 11, polyamide 12, polymethyl pentene, polyoxymethylene, polyethylene terephthalate, polybutylene terephthalate, polyvinylidene fluoride, polytetrafluoroethylene, perfluoroalkoxy alkane, polyphenylene sulfide, polyurethane, polyvinyl alcohol, polylactic acid, and polyether ether ketone.

3. The object green body of claim 1, wherein the shell has a tensile strength greater than about 1 MPa.

4. The green body of claim 1, wherein the core is at least about 50% encompassed by the shell.

5. The green body of claim 1, wherein a volume ratio of a loading of the polymer binder in the shell to a loading of the nanoparticle binder in the core ranges from about 250:1 to about 1:20.

6. The green body of claim 1, wherein a thickness of the shell ranges from about 1 mm to about 20 mm.

7. The green body of claim 1, wherein the shell further includes a metal salt binder.

8. The green body of claim 1, wherein the polymer binder is present in an amount of about 1 wt. % in the shell and the nanoparticle binder is present in an amount of about 0.02 wt. % in the core.

9. The green body of claim 1, wherein the nanoparticle binder has a size ranging from about 1 nm to about 50 nm.

10. A core of a green body, consisting of:
    a coalesced build material powder selected from the group consisting of a metal, a metal alloy, and a ceramic;
    a nanoparticle binder intermingled throughout the coalesced build material powder, the nanoparticle binder having a size ranging from about 1 nm to about 100 nm and selected from the group consisting of AlN, SiC, $Si_3N_4$, WC, $Al_2O_3$, Al(OH)$_3$, $Fe_2O_3$, $Fe_3O_4$, MgO, $SiO_2$, $TiO_2$, $Y_2O_3$, ZnO, $ZrO_2$, $BaCO_3$, $In_2O_3$, $SnO_2$, carbon, magnesium, manganese, aluminum, iron, titanium, niobium, tungsten, chromium, tantalum, cobalt, nickel, vanadium, zirconium, molybdenum, palladium, platinum, copper, silver, gold, cadmium, zinc, and combinations thereof; and
    one or more of a pigment, a dye, a solvent, a co-solvent, a co-solvent, a surfactant, a biocide, an anti-kogation agent, a viscosity modifier, a buffer, and a stabilizer.

11. A method comprising:
    spreading a layer of build material powder selected from the group consisting of a metal, a metal alloy, and a ceramic;
    selectively depositing a polymer binder onto a first select area on the spread layer of the build material powder to form a shell of a green body;
    selectively depositing a nanoparticle binder having a size ranging from about 1 nm to about 100 nm onto a second select area on the spread layer of build material powder to form a core of the green body consisting of the build powder material, the nanoparticle binder selected from the group consisting of AlN, SiC, $Si_3N_4$, WC, $Al_2O_3$, Al(OH)$_3$, $Fe_2O_3$, $Fe_3O_4$, MgO, $SiO_2$, $TiO_2$, $Y_2O_3$, ZnO $ZrO_2$, $BaCO_3$, $In_2O_3$, $SnO_2$, carbon, magnesium, manganese, aluminum, iron, titanium, niobium, tungsten, chromium, tantalum, cobalt, nickel, vanadium, zirconium, molybdenum, palladium, platinum, copper, silver, gold, cadmium zinc and combinations thereof, and one or more of a pigment, a dye, a solvent, a co-solvent, a surfactant, a biocide, an anti-kogation agent, a viscosity modifier, a buffer, and a stabilizer;
    applying energy to form a green body from the spread layer of build material powder, the deposited polymer binder, the deposited nanoparticle binder, and the one or more of a pigment, a dye, a solvent, a co-solvent, a surfactant, a biocide, an anti-kogation agent, a viscosity modifier, a buffer, and a stabilizer; and
    applying energy to the green body to form a brown body.

12. The method of claim 11, wherein the polymer binder is selectively deposited over a first select area of the spread layer of the build material powder to form the green body leaving a third area of the spread build material powder that does not form the green body.

13. The method of claim 11, wherein the step of applying energy to the green body to form the brown body further comprises applying sufficient energy to sinter the build material powder.

14. The method of claim 11, wherein the step of applying energy further comprises applying sufficient energy to cause interparticle binding within the core of the green body from the nanoparticle binder and the build material powder.

* * * * *